United States Patent Office 3,523,965
Patented Aug. 11, 1970

3,523,965
PREPARATION OF AROMATIC ISOCYANATES
Ehrenfried H. Kober, Hamden, Wilhelm J. Schnabel, Branford, Theodore C. Kraus, Cheshire, and Gerhard F. Ottmann, Hamden, Conn., assignors to Olin Corporation, a corporation of Virginia
No Drawing. Filed Apr. 10, 1967, Ser. No. 629,389
Int. Cl. B01j 11/12, 11/14; C07c 119/04
U.S. Cl. 260—453                                      13 Claims

ABSTRACT OF THE DISCLOSURE

An improvement in the process for preparing organic isocyanates directly by the reaction of an aromatic nitro compoun with carbon monoxide in the presence of a catalyst, said improvement being characterized by effecting the reaction in the presence of a small proportion of an acid halide.

---

This invention relates to an improved process for preparing organic isocyanates directly from the corresponding organic nitro compound.

Organic isocyanates are used extensively in the preparation of urethane foams, coatings, and fibers, as well as in the preparation of insecticides, pesticides and the like. Commercial processes for preparing organic isocyanates utilize the catalytic hydrogenation of an organic nitro compound to form the corresponding amine, followed by reaction of the amine with phosgene to form the corresponding isocyanate. These processes are complex and expensive, and the need for a simplified, less expensive process is apparent.

In order to provide a simplified technique, it has been proposed to react an organic nitro compound with carbon monoxide in the presence of a catalyst. For example, British Pat. No. 1,025,436 discloses a process for preparing isocyanates from the corresponding nitro compounds by reacting an organic nitro compound with carbon monoxide in the presence of a noble metal-based catalyst. This process is not used commercially because no more than trace amounts of organic isocyanates are formed when an organic nitro compound such as dinitrotoluene is reacted with carbon monoxide using a noble metal-based catalyst, such as rhodium trichloride, palladium dichloride, iridium trichloride, osmium trichloride and the like.

Other proposed simplified techniques utilize other catalyst systems. For example, Belgium Pat. No. 672,405, entitled, "Process for the Preparation of Organic Isocyanates," describes the use of a catalyst system of a noble metal and/or a Lewis acid in the reaction between an organic nitro compound with carbon monoxide.

Unfortunately, the yield of organic isocyanate afforded by these simplified techniques has not been significant enough to justify their use on a commercial scale.

It is a primary object of this invention to provide an improved process for the preparation of organic isocyanates.

Another object of the invention is to provide a novel technique for enhancing the effectiveness of the catalyst system in the reaction for preparing organic isocyanates directly from organic nitro compounds.

Still another object of the invention is to provide an improved process for preparing organic isocyanates in which the organic isocyanate component of the product is stabilized as it is produced during the reaction.

A further object of the invention is to provide a novel technique for regenerating active catalyst species in the reaction system.

Still another object of the invention is to provide for the conversion of small amounts of water (either present in the reactants or formed during the isocyanate reaction), into products which do not destructively react with isocyanates.

An additional object of this invention is to enhance the yields of isocyanates by converting any urea-type compounds formed in the reaction into isocyanates.

These and other objects of the invention will be apparent from the following detailed description thereof.

It has now been discovered that the above-mentioned objects are accomplished when an aromatic organic nitro compound is reacted with carbon monoxide in the presence of a catalyst and an acid halide. The proportion of acid halide is generally equivalent to between about 0.005 and about 0.1 mole of acid halide per mole of nitro groups in the aromatic nitro compound.

More in detail, any aromatic nitro compound capable of being converted to an organic isocyanate may be employed as a reactant. The term "aromatic nitro compound," as used throughout the description and claims, is intended to include unsubstituted as well as substituted aromatic nitro compounds. Typical examples of suitable aromatic nitro compounds which can be reacted to form isocyanates include the following:

(1) AROMATIC NITRO COMPOUNDS (a) Nitrobenzene
(b) Nitronaphthalenes
(c) Nitroanthracenes
(d) Nitrobiphenyls
(e) Bis(nitrophenyl)methanes
(f) Bis(nitrophenyl)ethers
(g) Bis(nitrophenyl)thioether
(h) Bis(nitrophenyl)sulfones
(i) Nitrodiphenoxy alkanes
(j) Nitrophenothiazines All of the aforementioned compounds may be substituted with one or more additional substituents such as nitro, nitroalkyl, alkyl, alkenyl, alkoxy, aryloxy, halogen, alkylthio, arylthio, carboxyalkyl, cyano, isocyanato, and the like, and employed as reactants in the novel process of this invention. Specific examples of suitable substituted-aromatic nitro compounds which can be used are as follows:

(1) o-Nitrotoluene
(2) m-Nitrotoluene
(3) p-Nitrotoluene
(4) o-Nitro-p-xylene
(5) 2-methyl-1-nitronaphthalene
(6) m-Dinitrobenzene
(7) p-Dinitrobenzene
(8) 2,4-dinitrotoluene
(9) 2,6-dinitrotoluene
(10) Dinitromesitylene
(11) 4,4'-dinitrobiphenyl
(12) 2,4-dinitrobiphenyl
(13) 4,4'-dinitrodibenzyl
(14) Bis(p-nitrophenyl)methane
(15) Bis(2,4-dinitrophenyl)methane
(16) Bis(p-nitrophenyl)ether
(17) Bis(2,4-dinitrophenyl)ether
(18) Bis(p-nitrophenyl)thioether
(19) Bis(p-nitrophenyl)sulfone
(20) Bis(p-nitrophenoxy)ethane
(21) Nitrophenyl nitromethane
(22) 2,4,6-trinitrotoluene
(23) 1,3,5-trinitrobenzene
(24) 1-chloro-2-nitrobenzene
(25) 1-chloro-4-nitrobenzene
(26) 1-chloro-3-nitrobenzene
(27) 2-chloro-6-nitrotoluene
(28) 4-chloro-3-nitrotoluene

(29) 1-chloro-2,4-dinitrobenzene
(30) 1,4-dichloro-2-nitrobenzene
(31) Alpha-chloro-p-nitrotoluene
(32) 1,3,5-trichloro-2-nitrobenzene
(33) 1,3,5-trichloro-2,4-dinitrobenzene
(34) 1,2-dichloro-4-nitrobenzene
(35) Alpha-chloro-m-nitrotoluene
(36) 1,2,4-trichloro-5-nitrobenzene
(37) 1-bromo-4-nitrobenzene
(38) 1-bromo-2-nitrobenzene
(39) 1-bromo-3-nitrobenzene
(40) 1-bromo-2,4-dinitrobenzene
(41) α,α-Dibromo-p-nitrotoluene
(42) α-Bromo-p-nitrotoluene
(43) 1-fluoro-4-nitrobenzene
(44) 1-fluoro-2,4-dinitrobenzene
(45) 1-fluoro-2-nitrobenzene
(46) o-Nitrophenyl isocyanate
(47) m-Nitrophenyl isocyanate
(48) p-Nitrophenyl isocyanate
(49) o-Nitroanisole
(50) p-Nitroanisole
(51) p-Nitrophenetole
(52) o-Nitrophenetole
(53) 2,4-dinitrophenetole
(54) 2,4-dinitroanisole
(55) 1-chloro-2,4-dimethoxy-5-nitrobenzene
(56) 1,4-dimethoxy-2-nitrobenzene
(57) m-Nitrobenzaldehyde
(58) p-Nitrobenzaldehyde
(59) p-Nitrobenzoylchloride
(60) m-Nitrobenzoylchloride
(61) 3,5-dinitrobenzoylchloride
(62) Ethyl-p-nitrobenzoate
(63) Methyl-o-nitrobenzoate
(64) m-Nitrobenzenesulfonylchloride
(65) p-Nitrobenzenesulfonylchloride
(66) o-Nitrobenzenesulfonylchloride
(67) 4-chloro-3-nitrobenzenesulfonylchloride
(68) 2,4-dinitrobenzenesulfonylchloride
(69) 3-nitrophthalic anhydride
(70) p-Nitrobenzonitrile
(71) m-Nitrobenzonitrile
(72) 3,3'-dimethoxy-4,4'-dinitro-biphenyl
(73) 3,3'-dimethyl-4,4'-dinitro-biphenyl
(74) 2-isocyanato-4-nitrotoluene
(75) 4-isocyanato-2-nitrotoluene In addition, isomers and mixtures of the aforesaid aromatic nitro compounds and substituted aromatic nitro-compounds may also be employed, as well as homologues and other related compounds. Generally, the aromatic nitro compounds and substituted aromatic nitro compounds contain between about 6 and about 14 carbon atoms.

Catalysts which may be employed in the novel technique of this invention include elements and compounds of elements found in Groups Ib, IIb, IIIa, IIIb, IVa, IVb, Va, Vb, VIa, VIb, VIIa, VIII and the Lanthanide series of the Periodic Table. When comparing the effectiveness as a catalyst of a given weight of these metals and compounds of metal, it was found that certain metals and compounds of these metals had a much greater catalytic effect than others. Those metals, in elemental or compound form, which are preferred because they show the greatest catalytic effect, are as follows:

(1) Palladium
(2) Rhodium
(3) Vanadium
(4) Molybdenum
(5) Tungsten
(6) Tantalum
(7) Chromium
(8) Niobium
(9) Platinum
(10) Cobalt
(11) Nickel
(12) Germanium
(13) Tin
(14) Osmium
(15) Copper
(16) Silver Other metals which may also be employed as a catalyst either in elemental or a compound form, but which are less effective than those listed above are as follows:

(1) Aluminum
(2) Scandium
(3) Manganese
(4) Iron
(5) Zinc
(6) Gallium
(7) Yttrium
(8) Zirconium
(9) Lutecium
(10) Masurium
(11) Ruthenium
(12) Cadmium
(13) Indium
(14) Lanthanum
(15) Hafnium
(16) Silicon
(17) Rhenium
(18) Iridium
(19) Titanium
(20) Gold
(21) Mercury
(22) Thallium
(23) Lead
(24) Cerium
(25) Praseodymium
(26) Neodymium
(27) Illinium
(28) Samarium
(29) Europium
(30) Gadolinium
(31) Terbium
(32) Dysprosium
(33) Holmium
(34) Erbium
(35) Thulium
(36) Ytterbium Compounds of the above elements which can be utilized in the process of this invention include oxides, sulfates, nitrates, halides, carbonates, sulfides, oxalates, and the like, and preferably a compound of one of the aforesaid preferred elements. Included in the latter group are platinum oxide, platinum dioxide, platinum dibromide, platinum dichloride, platinum tetrachloride, platinous cyanide, and platinum sulfate; palladium halides such as palladium dibromide, palladium dichloride, palladium difluoride, and palladium diiodide; rhodium halides such as rhodium tribromide, rhodium trichloride, rhodium trifluoride, and rhodium triiodide; palladium oxides such as palladium suboxide ($Pd_2O$), palladium monoxide (PdO), and palladium dioxide ($PdO_2$); rhodium oxides such as rhodium monoxide (RhO), rhodium sesquioxide ($Rh_2O_3$), and rhodium dioxide ($RhO_2$); chromic oxide ($Cr_2O_3$), chromium dioxide ($CrO_2$), and chromous oxide (CrO); molybdenum sesquioxide ($Mo_2O_3$), molybdenum dioxide ($MoO_2$), and molybdenum trioxide ($MoO_3$); niobium monoxide (NbO), niobium oxide ($NbO_2$), and niobium pentoxide ($Nb_2O_5$); tantalum dioxide ($Ta_2O_2$), tantalum tetraoxide ($Ta_2O_4$), and tantalum pentoxide ($Ta_2O_5$); tungstic oxide ($WO_2$), and tungstic trioxide ($WO_3$); and vanadium tetraoxide ($V_2O_4$) and vanadium pentoxide ($V_2O_5$), mixtures thereof, and the like.

In addition, carbonyls of certain elements such as nickel, cobalt, iron, rhodium, molybdenum, chromium, tungsten and carbonyl chloride of certain elements such as palladium, rhodium, and any of the aforesaid elements capable of forming carbonyls and carbonyl chlorides can be used as the catalyst. Mixtures of two or more of these compounds may be employed as the catalyst system.

Although all of the aforesaid catalyst systems, when used with acid halides in accordance with the process of this invention, have some effect upon increasing the yield of organic isocyanates, certain systems are significantly more effective than others. Included in these more effective systems are those comprised of a mixture of at least one compound selected from the group consisting of palladium halides, rhodium halides, palladium oxides, and rhodium oxides with an oxide of an element selected from the group consisting of vanadium, molybdenum, tungsten, niobium, chromium, and tantalum, with or without other catalysts, and especially the following:

(1) Palladium dichloride and vanadium pentoxide
(2) Palladium dichloride and molybdenum dioxide
(3) Rhodium trichloride and vanadium pentoxide
(4) Rhodium trichloride and molybdenum dioxide
(5) Palladium dichloride, rhodium trichloride and vanadium pentoxide
(6) Rhodium trichloride, platinum tetrachloride and vanadium pentoxide (7) Palladium dichloride, molybdenum dioxide and cupric bromide (8) Palladium dichloride, rhodium chloride, vanadium pentoxide and cupric bromide.

When one of the above-mentioned preferred catalyst systems is employed, the weight ratio of palladium or rhodium compound to oxide of the Group Vb or VIb metals in the catalyst system is generally in the range between about 0.001:1 and about 25:1, and preferably in the range between about 0.05:1 and about 10:1, but greater or lesser proportions may be employed if desired. When other catalytic additives such as cupric bromide, platinum tetrachloride and the like are employed as part of the catalyst system, the weight ratio of the catalytic additive to the oxide of the Group Vb or VIb metals is also within the above-mentioned catalyst ratio ranges.

The catalyst system can be self-supported or deposited on a support or carrier for dispersing the catalyst system to increase its effective surface. Alumina, silica, carbon, barium sulfate, calcium carbonate, asbestos, bentonite, diatomaceous earth, fuller's earth, and analogous materials are useful as carriers for this purpose.

The proportion of catalyst system is generally in the range between about 0.1 and about 100, and preferably between about 1 and about 60 percent by weight of the aromatic nitro compound. However, greater or lesser proportions may be employed if desired.

The process of this invention is carried out in the presence of an acid halide capable of enhancing the activity of the catalyst while stabilizing the aromatic isocyanate as it is formed. Acid halides useful in the process of this invention are selected from the group consisting of acid halides of carbon, acid halides of sulfur, acid halides of phosphorus, acid halides of vanadium, and organic acid halides (RCO Hal) and organic sulfonyl halides (RSO$_2$ Hal) where R is selected from the group consisting of an aromatic, aliphatic, and mixed aromatic-aliphatic moiety. Typical examples of suitable halides include phosgene, thionyl chloride, thionyl bromide, thionyl fluoride, sulfonyl chloride, phosphorus oxychloride, phosphorus oxyfluoride, phosphorus oxybromide, vanadyl monobromide (VOBr), vanadyl dibromide (VOBr$_2$), vanadyl tribromide (VOBr$_3$), vanadyl chloride [(VO)$_2$Cl], vanadyl dichloride (VOCl$_2$), and vanadyl trichloride (COCl$_3$). Suitable organic acid chlorides include benzoyl chloride, acetyl chloride, propionyl chloride, oxalyl chloride, fumaryl chloride, succinyl chloride. Other suitable compounds include the carbonic acid chlorides and sulfonic acid chlorides described in Canadian Pat. No. 692,093, issued Aug. 4, 1964, to Ehrenfried H. Kober et al.

The reaction is carried out in the presence of an effective proportion of acid halide. The proportion of acid halide is generally equivalent to between about 0.005 and about 0.1 and preferably between about 0.006 and about 0.09 mole of acid halide per mole of nitro groups in the aromatic nitro compound.

The reaction between carbon monoxide and organic isocyanate may be effected in the absence of a solvent, but improved overall yields of the organic isocyanates can be obtained when a solvent which is chemically inert to the components of the reaction system is employed. Suitable solvents include aliphatic, cycloaliphatic and aromatic solvents such as n-heptane, cyclohexane, benzene, toluene and xylene, and halogenated aliphatic and aromatic hydrocarbons such as dichloromethane, tetrachloroethane, monochloronaphthalene, monochlorobenzene, dichlorobenzene, trichloroethylene, and perchloroethylene, as well as sulfur dioxide, mixtures thereof and the like.

The proportion of solvent is not critical and any proportion may be employed which will not require excessively large equipment to contain. Generally, the weight percent of aromatic nitro compound in the solvent is in the range between about 5.0 and about 75 percent, but greater or lesser proportions may be employed, if desired.

The order of mixing the reactants is not critical and may be varied within the limitations of the equipment employed. In one embodiment, the aromatic nitro compound, catalyst system, acid halide and, if desired, solvent, is charged to a suitable pressure vessel such as an autoclave which was previously purged with nitrogen, and which is preferably provided with agitation means such as a stirrer or an external rocking mechanism. Carbon monoxide is fed into the autoclave until a pressure is attained which is in the range between about 30 and about 10,000 p.s.i.g., and preferably between about 100 and about 8,000 p.s.i.g., but greater or lesser pressures may be employed during the reaction if desired.

In another embodiment, one or more of the reactants can be fed continuously into the reactor. For example, the carbon monoxide and the acid halide can be fed continuously, either separately or comingled, to a batch of aromatic nitro compound containing the catalyst in the absence or presence of the solvent. Other modifications will be obvious to one skilled in the art, such as feeding all of the reactants, and solvent, if any, continuously to the reaction while simultaneously withdrawing off-gases and reaction products.

Generally, the quantity of carbon monoxide in the free space of the reactor is sufficient to maintain the desired pressure as well as provide reactant for the process, as the reaction progresses. If desired, additional carbon monoxide can be fed to the reactor either intermittently or continuously as the reaction progresses. The reaction is believed to progress in accordance with the following equation:

(I)     $R(NO_2)_n + 3nCO \rightarrow R(NCO)_n + 2nCO_2$ where R is the organic moiety of the aromatic nitro compound reactant of the type defined above, and $n$ is the number of nitro groups in the aromatic nitro compound. The total amount of carbon monoxide added during the reaction is generally between about 3 and about 50, and preferably between about 8 and about 15 moles of carbon monoxide per nitro group in the aromatic nitro compound. Greater or lesser amounts may be employed if desired. The highest carbon monoxide requirements are generally utilized in a process in which the carbon monoxide is added continuously, but suitable recycle of the carbon monoxide-containing gas streams greatly reduces the overall consumption of carbon monoxide.

The reaction temperature is maintained above about 25° C. and preferably between about 100 and about 250° C. Interior and/or exterior heating and cooling means may be employed to maintain the temperature within the reactor within the desired range.

The reaction time is dependent upon the aromatic nitro compound being reacted, and on the catalyst and the amount of catalyst being charged, as well as the type of equipment being employed. Usually between one-half hour and 20 hours are required to obtain the desired degree of recation, but shorter or longer reaction times may be employed.

The reaction can be carried out batchwise, semicontinuously or continuously.

After the reaction is completed, the temperature of the crude reaction mixture may be dropped to ambient temperature, the pressure vessel is vented, and the reaction products are removed from the reaction vessel. Filtration or other suitable solid-liquid separation technique may be employed to separate the catalyst from the reaction product, and fractional distillation is preferably employed to isolate the aromatic isocyanate from the reaction product. However, other suitable separation techniques such as extraction, sublimation, etc., may be employed to separate the aromatic isocyanate from the unreacted aromatic nitro compound, the acid halide, and any byproducts that may be formed.

The presence of a small proportion of an acid halide in the system in which an aromatic nitro compound is being directly converted to an aromatic isocyanate by means of carbon monoxide in the presence of a catalyst, as specified above, results in improved yields of aromatic isocyanate when compared to similar reactions in which no acid halide is present. Although the mode of action of the acid halide in the novel reaction system of this invention is not completely understood, there is evidence for the following effects which in turn promote the reaction to give higher yields of aromatic isocyanates:

(1) Water, which may be introduced with the reactants as an inherent impurity or formed during the reaction, reacts with the acid halide to form harmless products; e.g., phosgene reacts with water to give hydrogen chloride and carbon dioxide. Thus, at least part of the water is being removed from the reaction system and thus can not react with the desired isocyanate compound to give urea-type products.

(2) Any urea-type products formed during the reaction are converted by means of phosgene to the corresponding isocyanates according to the following reaction:

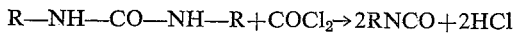

R—NH—CO—NH—R+COCl$_2$→2RNCO+2HCl (3) It has been established that noble metal halides, such as for example palladium dichloride and rhodium trichloride, which are part of the catalyst systems employed for the direct conversion of aromatic nitro compounds to aromatic isocyanates by means of carbon monoxide, are during the course of the reaction partially reduced to metallic palladium and rhodium. It has been furthermore established, that catalyst systems consisting of noble metals in metallic form in combination with non-noble metal cocatalysts, are not highly effective for the conversion of aromatic nitro compounds to aromatic isocyanates, unless an acid halide such as referred to above is present in the reaction mixture. The presence of an acid halide in conjunction with carbon monoxide leads to the oxidation of metallic noble metals to give active catalyst species and thus promotes the activity of the catalyst system and extends its life.

(4) Any acid halide not utilized either for removing water from the system or for converting urea-type products into isocyanates or for converting inactive metal species into active catalyst species will stabilize the isocyanate formed in accordance with this invention.

Aromatic isocyanates produced in accordance with the technique of this invention are suitable for use in preparing urethane compounds such as foams, coatings, fibers, and the like by reacting the organic isocyanate with a suitable polyether polyol in the presence of a catalyst and, if desired, a foaming agent, and as intermediates for biologically active compounds.

The following examples are presented to further illustrate the invention without any intention of being limited thereby. All parts and percentages are by weight unless otherwise specified.

EXAMPLE 1

Into a 100-milliliter stainless steel autoclave were placed 6.0 grams of nitrobenzene, 3 percent palladium dichloride, 2 percent vanadium pentoxide, based upon the weight of nitrobenzene, and 5 milliliters of orthodichlorobenzene containing 2.5 percent phosgene. The autoclave was sealed, purged with carbon monoxide, vented and then filled with carbon monoxide to a pressure of 2085 p.s.i.g. The autoclave and contents were then heated to a temperature of 190 C. for 1.5 hours with agitation, while obtaining a maximum pressure of 2840 p.s.i.g. At the end of this period the autoclave was vented, then opened, and the contents removed for analysis. Analysis by vapor phase chromatography showed a nitrobenzene conversion of 100 percent and a yield of phenyl isocyanate of 67 percent.

EXAMPLE 2

Employing the apparatus of Example 1, the autoclave was charged with 3.0 grams of 2,4-dinitrotoluene, 3 percent rhodium trichloride, 6 percent vanadium pentoxide, based upon the weight of dinitrotoluene, and 5 milliliters of orthodichlorobenzene containing 2.5 percent phosgene. After subjecting the charge to reaction conditions similar to Example 1, the reaction product was removed and filtered. Analysis of the filtrate showed a conversion of dinitrotoluene of 32.7 percent, a yield of organic isocyanates of 51.5 percent, and a yield of toluene diisocyanate of 11.9 percent.

EXAMPLE 3

The procedure of Example 1 was repeated except that the phosgene in orthodichlorobenzene was replaced with thionyl chloride. The conversion of nitrobenzene was 100 percent and the yield of phenylisocyanate was 44.5 percent.

EXAMPLE 4

The procedure of Example 1 was repeated with the exception that phosgene in the orthodichlorobenzene was replaced with benzoyl chloride. Analysis of the filtrate showed a conversion of nitrobenzene of 100 percent, and a yield of phenyl isocyanate of 69.2 percent.

EXAMPLE 5

The procedure of Example 1 was repeated with the exception that phosgene in the orthodichlorobenzene was replaced with oxalyl chloride. Analysis of the filtrate showed a conversion of 42.3 percent, and a yield of phenyl isocyanate of 72.6 percent.

EXAMPLE 6

The procedure of Example 1 was repeated with the exception that phosgene in the orthodichlorobenzene was replaced with sulfuryl chloride. Analysis of the filtrate showed a conversion of 88.7 percent, and a yield of phenyl isocyanate of 66.6 percent.

EXAMPLE 7

The autoclave of Example 1 was charged with 6.0 g. of nitrobenzene, 1 percent palladium dichloride, 6 percent vanadium pentoxide, and 1 percent vanadium oxydichloride, based on the weight of the nitrobenzene. The autoclave was sealed, purged with carbon monoxide, vented, and then filled with carbon monoxide to a pressure of 1345 p.s.i.g. The autoclave and contents were then heated to a temperature of 190° C. for a period of 1.5 hours with agitation, while attaining a maximum pressure of 1900 p.s.i.g. Analysis of the resulting filtrate showed a nitrobenzene conversion of 57.1 percent and a yield of phenyl isocyanate of 45.1 percent.

EXAMPLE 8

The autoclave of Example 1 was charged with 6 g. of nitrobenzene, 3 percent rhodium trichloride, 2 percent vanadium pentoxide, and 1 percent phosphorus oxychloride, based upon the weight of the nitrobenzene, and 5 ml. of orthodichlorobenzene. Following the procedure of Example 1, except that the initial carbon monoxide pressure was 2590 and the maximum pressure during the reaction was 4030 p.s.i.g., the charge was reacted to produce phenyl isocyanate. Analysis of the filtrate showed a conversion of nitrobenzene of 71.2 percent and a yield of phenyl isocyanate of 48.4 percent.

Various modifications of the invention, some of which have been referred to above, may be employed without departing from the spirit of the invention. What is desired to be secured by Letters Patent is:

1. The process for preparing an aromatic isocyanate directly by the reaction of an aromatic nitro compound with carbon monoxide in the presence of a catalyst and an acid halide at an elevated pressure and an elevated temperature, (a) the proportion of said carbon monoxide being at least 3 moles per mole of nitro groups in said aromatic nitro compound,
((b) said catalyst being a mixture of a compound selected from the group consisting of palladium halides, rhodium halides, palladium oxides, rhodium oxides and mixtures thereof, with an oxide of an element selected from the group consisting of vanadium, molybdenum, tungsten niobium, chromium and tantalum,
(c) said acid halide being selected from the group consisting of an acid halide of carbon an acid halide of sulfur, an acid halide of phosphorus, and an acid halide of vanadium, and
(d) the proportion of said acid halide being equivalent to between about 0.005 and about 0.1 mole of acid halide per mole of nitro groups in said aromatic nitro compound.

2. The process of claim 1 wherein said acid halide is benzoyl chloride.

3. The process of claim 1 wherein said acid halide is thionyl chloride.

4. The process of claim 1 wherein said acid halide is oxalyl chloride.

5. The process of claim 1 wherein said acid halide is sulfuryl chloride.

6. The process of claim 1 wherein said acid halide is vanadium oxychloride.

7. The process of claim 1 wherein said acid halide is phosphorus oxychloride.

8. The process of claim 1 wherein said aromatic nitro compound is selected from the group consisting of nitrobenzene, monoisocyanato - mononitrotoluenes, dinitrotoluenes and mixtures thereof.

9. The process of claim 8 wherein said acid halide is selected from the group consisting of benzoyl chloride, thionyl chloride, phosgene, oxalyl chloride, sulfuryl chloride, vanadium oxychloride and phosphorus oxychloride.

10. The process of claim 1 wherein said acid halide is phosgene.

11. The process of claim 10 wherein said aromatic nitro compound is dinitrotoluene and said aromatic isocyanate is toluene diisocyanate.

12. The process of claim 11 wherein said catalyst is a mixture of rhodium trichloride and vanadium pentoxide, the proportion of said catalyst being in the range between about 1 and about 60 percent by weight of said dinitrotoluene, the weight ratio of rhodium trichloride to vanadium pentoxide being in the range between about 0.05:1 and about 10:1.

13. The process of claim 12 wherein rhodium trichloride is deposited on carbon.

References Cited

UNITED STATES PATENTS 1,848,723  3/1932  Jaeger _____ 252—415 XR
3,057,915  10/1962  Riemenschneider et al.
                                    252—415 XR
3,405,156  10/1968  Stern et al. _____ 260—453

FOREIGN PATENTS 672,405  5/1966  Belgium.

OTHER REFERENCES

Olah: "Friedel-Crafts and Related Reactions," vol. I, Interscience Publishers, New York, pp. 308–12 (1964).

CHARLES B. PARKER, Primary Examiner

D. H. TORRENCE, Assistant Examiner

U.S. Cl. X.R.

23—86; 252—415, 426, 430, 437, 438, 439, 440, 441, 461, 463, 467, 470, 472, 475, 476; 260—543, 544, 553, 689